United States Patent Office 2,819,241
Patented Jan. 7, 1958

2,819,241

REACTION PRODUCTS OF CARBOXYLATED PHENOL-ALDEHYDE RESINS AND AMINE-MODIFIED PHENOL-ALDEHYDE RESINS AND PROCESS OF MAKING SAME

Melvin De Groote, University City, Mo., assignor to Petrolite Corporation, Wilmington, Del., a corporation of Delaware No Drawing. Application October 23, 1953
Serial No. 388,052

20 Claims. (Cl. 260—43)

The present invention is concerned with processes involving reactions between certain amine-modified phenol-aldehyde resins and certain carboxylated resins. Furthermore, it is concerned with the products so obtained and their uses in various arts.

U. S. Patent No. 2,571,118, dated October 16, 1951, to De Groote and Keiser, describes a fusible, carboxyl-containing, xylene-soluble, water-insoluble, low-stage phenol-aldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicyclic acid employed in relation to the non-carboxylated phenol being sufficient to contribute at least one salicylic acid radical per resin molecule and the amount of difunctional monohydric hydrocarbon - substituted phenol being sufficient to contribute at least one difunctional monohydric hydrocarbon-substituted phenol radical per molecule; said resin being formed in the substantial absence of phenols of functionality greater than two, and said phenol being of the formula

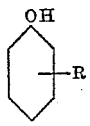

in which R is a hydrocarbon radical having at least 4 and not more than 14 carbon atoms and substituted in one of the positions ortho and para.

More specifically, the present invention is concerned with the reaction between said carboxylated resins above described and certain amine-modified thermoplastic phenol-aldehyde resins; such amine-modified resins are described in my co-pending application, Serial No. 376,240, filed August 24, 1953. A typical claim of said aforementioned co-pending application is as follows:

The process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

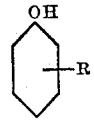

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the further proviso that the ratio of reactants be approximately 1:3:3 to 1:4:4, respectively, and with the final proviso that the resinous condensation product resulting from the process be organic solvent-soluble.

The carboxylated phenol-aldehyde resins above described generally contain one or more carboxyl radicals, and generally two or more carboxyl radicals. The amine-modified phenol-aldehyde resins above described invariably have at least two alkanol radicals and may have more. Thus, the two types of reactants readily can form the equivalent of esters and particularly linear polymers dependent on ester linkages.

More specifically then the present invention is concerned with an acylation process involving (A) a carboxylated resin, said carboxylated resin being a fusible, carboxyl-containing, xylene-soluble, water-insoluble, low-stage phenol-aldehyde resin, said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula

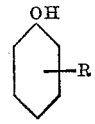

in which R is a hydrocarbon radical having at least 4 and not more than 14 carbon atoms and substituted in one of the positions ortho and para; and (B) an amine-modified phenol-aldehyde resin, said amine-modified resin being obtained by the process of condensation of (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

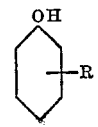

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the further proviso that the ratio of reactants be approximately 1:3:3 to 1:4:4, respectively, and with the final proviso that the resinous condensation product resulting from the process be organic solvent-soluble.

Furthermore, the present invention is concerned with the products obtained by the acylation process described immediately preceding.

For purpose of convenience, what is said hereinafter will be divided into six parts:

Part 1 is concerned with the preparation of the carboxylated resins;

Part 2 is concerned with the phenol-aldehyde resin which is subjected to modification by condensation reaction to yield an amine-modified resin;

Part 3 is concerned with appropriate basic hydroxylated secondary monoamines which may be employed in the preparation of the herein-described amine-modified resins;

Part 4 is concerned with reactions involving the resin, the amine, and formaldehyde to produce specific products or compounds;

Part 5 is concerned with the acylation or esterification reaction involving the carboxylated resins on the one hand and the amine-modified resins on the other hand; and Part 6 is concerned with uses for the products described in Part 5, preceding.

PART 1

U. S. Patent No. 2,571,118, dated October 16, 1951, to De Groote and Keiser, describes a fusible, carboxyl-containing, xylene-soluble, water-insoluble, low-stage phenol-aldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula:

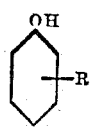

in which R is a hydrocarbon radical having at least 4 and not more than 14 carbon atoms and substituted in one of the positions ortho and para.

The present invention is concerned with the use of such carboxyl-containing resins obtained from a reactant mixture in which 1 to 2 moles of salicylic acid are used in conjunction with 3 to 5 moles of a substituted phenol as described. In most instances the preferred mixture involves a 3:2 or 4:1 molal ratio of substituted phenol to salicylic acid.

Assuming one used 4 moles of amylphenol and one mole of salicylic acid, the resin in its simplest aspect may be represented in an idealized form in the following manner:

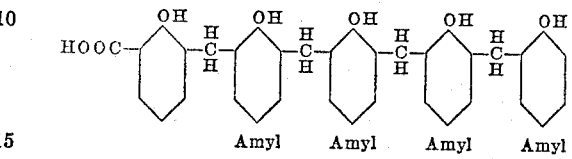

The above formula is, of course, an idealized structure, for obvious reasons, because the salicylic acid nucleus presumably can appear at any point in the resin molecule. Such resin, or for that matter, a resin having an increased number of salicylic acid radicals, can be oxyalkylated in the same manner as other phenol-aldehyde resins.

If obtained from 2 moles of salicylic acid and 3 moles of amylphenol the corresponding idealized formula would be thus:

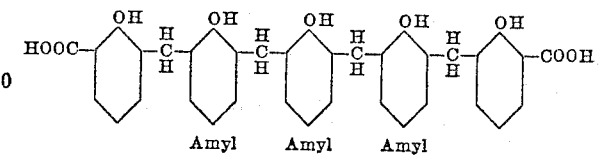

As to the preparation of such resins, purely by way of illustration certain examples are repeated substantially in verbatim form as they appear in said aforementioned U. S. Patent No. 2,571,118. In said patent there is reference to an example which illustrates resinification without use of salicylic acid. For continuity of text this example obviously is included.

*Example 1aa*

| | Grams |
|---|---|
| Para-tertiary butylphenol | 150 |
| Formaldehyde, 37% | 81 |
| Concentrated HCl | 1.5 |
| Monoalkyl ($C_{10}$–$C_{20}$, principally $C_{12}$–$C_{14}$ benzene monosulfonic acid sodium salt) | 0.8 |
| Xylene | 100 |

Examples of alkylaryl acids which serve as catalysts and as emulsifiers particularly in the form of sodium salts, include the following

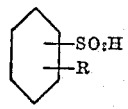

R is an alkyl hydrocarbon radical having 12–14 carbon atoms.

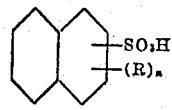

R is an alkyl radical having 3–12 carbon atoms and $n$ represents the numeral 3, 2, or 1, usually 2, in such instances, where R contains less than 8 carbon atoms.

With respect to alkylaryl sulfonic acids or the sodium salts, we have employed a monoalkylated benzene monosulfonic acid or the sodium salt thereof, wherein the alkyl group contains 10 to 14 carbon atoms. We have found equally effective and interchangeable the following specific sulfonic acids, or their sodium salts. A mixture of di- and tripropylated naphthalene monosulfonic acid; diamylated naphthalene monosulfonic acids; and nonyl naphthalene monosulfonic acid.

The equipment used was a conventional two-piece laboratory resin pot. The cover part of the equipment had four openings; one for reflux condenser, one for the stirring device; one for a separatory funnel or other means of adding reactants; and a thermometer well. In the manipulation employed the separatory funnel insert for adding reactants was not used. The device was equipped with a combination reflux and water-trap apparatus, so that the single piece of equipment could be used as either a reflux condenser or a water trap, depending upon the position of the three-way glass stop-cocks. This permitted convenient withdrawal of water from the water trap. The equipment, furthermore, permitted any setting of the valve without disconnecting the equipment. The resin pot was heated with a glass fibre electrical heater constructed to fit snugly around the resin pot. Such heaters, with regulators, are readily available.

The phenol, formaldehyde, acid catalyst, and solvent were combined in the resin pot, above described. This particular phenol was in the form of a flaked solid. Heat was applied, with gentle stirring, and the temperature was raised to 80–85° C., at which point a mild exothermic reaction took place. This reaction raised the temperature to approximately 105–110° C. The reaction mixture was then permitted to reflux at 100–105° C. for between one and one-and-one-half hours. The reflux trap arrangement was then changed from the reflux position to the normal water entrapment position. The water of solution and the water of reaction were permitted to distill out and collect in the trap. As the water distilled out, the temperature gradually increased to approximately 150° C. which required between 1.5 to 2 hours. At this point the water recovered in the trap, after making allowance for a small amount of water held up in the solvent, corresponded to the expected quantity.

The solvent solution so obtained was used as such in subsequent oxyalkylation steps. We have removed also the solvent by conventional means, such as evaporation, distillation, or vacuum distillation, and we customarily take a small sample of the solvent solution and evaporate the solvent to note the characteristics of the solvent-free resin. The resin obtained in the operation above described was clear, light amber colored, hard, brittle, and had a melting point of 160–165° C.

Attention is directed to the fact that tertiary butylphenol in presence of a strong mineral acid as a catalyst and using formaldehyde, sometimes yields a resin which apparently has a very slight amount of cross-linking. Such resin is similar to the one described above, except that it is sometimes opaque, and its melting point is higher than the one described above and there is a tendency to cure. Such a resin generally is dispersible in xylene but not soluble to give a clear solution. Such dispersion can be oxyalkylated in the same manner as the clear resin. If desired, a minor proportion of another and inert solvent, such as diethyleneglycol diethylether, may be employed along with xylene, to give a clear solution prior to oxyalkylation. This fact of solubilization shows the present resin molecules are still quite small, as contrasted with the very large size of extensively cross-linked resin molecules. If, in following a given procedure with a given lot of the phenol, such a resin is obtained, the amount of catalyst employed is advantageously reduced slightly, or the time of reflux reduced slightly, or both, or an acid such as oxalic acid is used instead of hydrochloric acid. Purely as a matter of convenience due to better solubility in xylene, we prefer to use a clear resin, but if desired, either type may be employed. (See Example 1a of aforementioned Patent No. 2,571,118.)

Example 2aa

| | |
|---|---|
| Para-tertiary nonylphenol (3.0 moles) _____grams__ | 660 |
| Salicylic acid (2.0 moles) _____do____ | 276 |
| Formaldehyde 37% (5.0 moles) _____do____ | 405 |
| Xylene _____do____ | 700 |
| HCl (concentrated) _____ml__ | 40 |
| Dodecyl toluene monosulfonic acid sodium salt grams__ | 3 |

The same procedure was followed as in Example 1aa, preceding, except that the reflux period was 5 hours, instead of 1½ hours. Also, note the marked increase in amount of acid used as a catalyst in this instance.

The resin solution so obtained contained approximately 41.2% xylene.

The solvent-free resin was pale reddish amber in color, xylene-soluble, clear, and quite soft in consistency. (See Example 18a of aforementioned Patent 2,571,118.)

Example 3aa

| | |
|---|---|
| Para-tertiary amylphenol (4.0 moles) _____grams__ | 656 |
| Salicylic acid (1.0 mole) _____do____ | 138 |
| Formaldehyde 37% (5.0 moles) _____do____ | 405 |
| Xylene _____do____ | 700 |
| HCl (concentrated) _____ml__ | 40 |
| Dodecyl toluene monosulfonic acid sodium salt grams__ | 3 |

The same procedure was followed as in Example 1aa, preceding, except that the reflux period was 5 hours, instead of 1½ hours. Also, note the marked increase in amount of acid used as a catalyst in this instance.

The resin solution so obtained, contained approximately 45% xylene. The solvent-free resin was reddish amber in color, slightly opaque, obviously xylene-soluble, and somewhat hard to pliable in consistency. (See Example 7a of aforementioned Patent 2,571,118.)

Example 4aa

| | |
|---|---|
| Para-tertiary amylphenol (3.0 moles) _____grams__ | 492 |
| Salicylic acid (2.0 moles) _____do____ | 276 |
| Formaldehyde 37% (5.0 moles) _____do____ | 405 |
| Xylene _____do____ | 700 |
| HCl (concentrated) _____ml__ | 40 |
| Dodecyl toluene monosulfonic acid sodium salt grams__ | 3 |

The same procedure was followed as in Example 1aa, preceding, except that the reflux period was 5 hours, instead of 1½ hours. Also, note the marked increase in amount of acid used as a catalyst in this instance.

The resin solution so obtained contained approximately 48.8% xylene. The solvent-free resin was reddish amber in color, clear, xylene-soluble and semi-soft or pliable in consistency. (See Example 13a of aforementioned Patent 2,571,118.)

Example 5aa

| | |
|---|---|
| Para-secondary butylphenol (3.0 moles) ___grams__ | 450 |
| Salicylic acid (2.0 moles) _____do____ | 276 |
| Formaldehyde 37% (5.0 moles) _____do____ | 405 |
| HCl (concentrated) _____ml__ | 40 |
| Xylene _____grams__ | 700 |
| Dodecyl toluene monosulfonic acid sodium salt grams__ | 3 |

The same procedure was followed as in Example 1aa, preceding, except that the reflux period was 5 hours, instead of 1½ hours. Also, note the marked increase in amount of acid used as a catalyst in this instance.

The resin solution, so obtained, contained approximately 44.2% xylene. The solvent-free resin was amber in color, slightly opaque, almost entirely soluble in xylene, and fairly hard or pliable in consistency. (See Example 14a of aforementioned Patent 2,571,118.)

Example 6aa

| | | |
|---|---|---|
| Para-octylphenol (3.0 moles) | grams | 618 |
| Salicylic acid (2.0 moles) | do | 276 |
| Formaldehyde 37% | do | 405 |
| Xylene | do | 700 |
| HCl (concentrated) | ml | 40 |
| Dodecyl toluene monosulfonic acid sodium salt | grams | 3 |

The same procedure was followed as in Example 1aa, preceding, except that the reflux period was 5 hours instead of 1½ hours. Also, note the marked increase in amount of acid used as a catalyst in this instance.

The resin solution, so obtained, contained approximately 42.3% xylene. The solvent-free resin was clear, reddish amber in color, xylene-soluble, and semi-hard to pliable in consistency. (See Example 16a of aforementioned Patent 2,571,118.)

Example 7aa

| | Grams |
|---|---|
| Para-tertiary amylphenol (4.0 moles) | 656 |
| Salicylic acid (1.0 mole) | 138 |
| Propionaldehyde (5.0 moles) | 305 |
| Xylene | 700 |
| Concentrated sulfuric acid | 20 |

Whenever propionaldehyde or similar aldehydes were employed the procedure was changed slightly from that employed in Example 1aa. The equipment employed, however, was the same. The amylphenol, salicylic acid, xylene and acid catalyst were combined in the resin pot, stirred and heated to 150° C. At this point the propionaldehyde was added slowly for about 1½ hours, after which the whole reaction mass was permitted to reflux for 5 hours at the reflux temperature of water or slightly above, i. e., 100°–110° C., before distilling out water. The amount of water distilled out was 102 cc.

The resin solution so obtained contained approximately 41.2% xylene. The solvent-free resin was reddish-black, clear, xylene-soluble and hard but not brittle in consistency.

(See Example 19a of aforementioned U. S. Patent No. 2,571,118.)

PART 2

It is well known that one can readily purchase on the open market, or prepare, fusible, organic solvent-soluble, water-insoluble resin polymers of a composition approximated in an idealized form by the formula

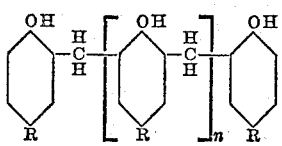

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 15 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

Because a resin is organic solvent-soluble, does not mean it is necessarily soluble in any organic solvent. This is particularly true where the resins are derived from trifunctional phenols as previously noted. However, even when obtained from a difunctional phenol, for instance, para-phenylphenol, one may obtain a resin which is not soluble in a nonoxygenated solvent, such as benzene, or xylene, but requires an oxygenated solvent such as a low molal alcohol, dioxane, or diethyleneglycol diethylether. Sometimes a mixture of the two solvents (oxygenated and non-oxygenated) will serve. See Example 9a of U. S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368, dated March 7, 1950, to De Groote and Keiser. In said patent there are described oxyalkylation-susceptible, fusible, nonoxygenated organic solvent-soluble, water-insoluble, low-stage phenolaldehyde resins having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

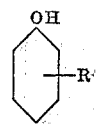

in which R is an aliphatic hydrocarbon radical having at least 4 carbon atoms and not more than 24 carbon atoms, and substituted in the 2, 4, 6 position.

If one selected a resin of the kind just described previously and reacted approximately one mole of the resin with two moles of formaldehyde and two moles of a basic nonhydroxylated secondary amine as specified, following the same idealized over-simplification previously referred to, the resultant product might be illustrated thus:

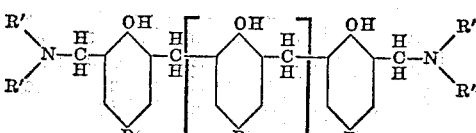

The basic hydroxylated amine may be designated thus:

In conducting reactions of this kind one does not necessarily obtain a hundred percent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

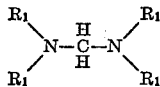

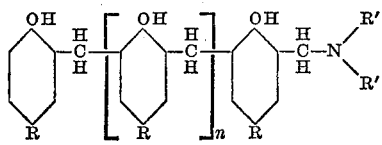

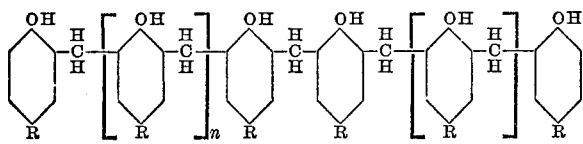

As has been pointed out previously, as far as the resin unit goes one can use a mole of aldehyde other than formaldehyde, such as acetaldehyde, propionaldehyde or butyraldehyde. The resin unit may be exemplified thus:

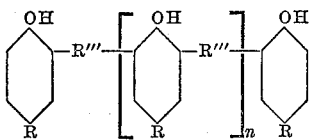

in which $R'''$ is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U. S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins I found no reason for using other than those which are lowest in price and most readily available commercially. For purposes of convenience suitable resins are characterized in the following table:

TABLE I

| Example number | R | Position of R | $R'''$ derived from— | $n$ | Mol. wt. of resin molecule (based on $n+2$) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclo-hexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclo-hexyl | do | do | 2.0 | 740.0 |

PART 3

As has been pointed out previously the amine herein employed as a reactant is a basic hydroxylated secondary monoamine whose composition is indicated thus:

in which $R'$ represents a monovalent alkyl, alicyclic, arylalkyl radical which may be heterocyclic in a few instances as in a secondary amine derived from furfurylamine by reaction as ethylene oxide or propylene oxide. Furthermore, at least one of the radicals designed by $R'$ must have at least one hydroxyl radical. A large number of secondary amines are available and may be suitably employed as reactants for the present purpose. Among others, one may employ diethanolamine, methyl ethanolamine, dipropanolamine and ethylpropanolamine. Other suitable secondary amines are obtained, of course, by taking any suitable primary amine, such as an alkylamine, an arylalkylamine, or an alicyclic amine, and treating the amine with one mole of an oxyalkylating agent, such as ethylene oxide, propylene oxide, butylene oxide, glycide, or methylglycide. Suitable primary amines which can be so converted into secondary amines, include butylamine, amylamine, hexylamine, higher molecular weight amines derived from fatty acids, cyclohexylamine, benzylamine, furfurylamine, etc. In other instances secondary amines which have at least one hydroxyl radical can be treated similarly with an oxyalkylating agent, or, for that matter with an alkylating agent such as benzylchloride, esters of chloroacetic acid, alkyl bromides, dimethylsulfate, esters of sulfonic acid, etc., so as to convert the primary amine into a secondary amine. Among others, such amines include 2-amino-1-butanol, 2-amino-2-methyl-1-propanol, 2-amino-2-methyl-1,8-propanediol, 2-amino-2-ethyl-1,3-propanediol, and tri(hydroxymethyl)-aminomethane. Another example of such amines is illustrated by 4-amino-4-methyl-2-pentanol.

Similarly, one can prepare suitable secondary amines which have not only a hydroxyl group but also one or more divalent oxygen linkages as part of an ether radical. The preparation of such amines or suitable reactants for preparing them has been described in the literature and particularly in two United States patents, to wit, U. S. Patents Nos. 2,325,514, dated July 27, 1943, to Hester, and 2,355,337, dated August 8, 1944, to Spence. The latter patent describes typical haloalkyl ethers such as

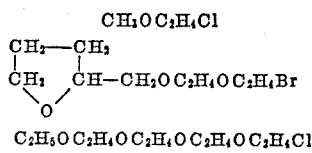

Such haloalkyl ethers can be reacted with ammonia or with a primary amine, such as ethanolamine, propanolamine, monoglycerylamine, etc., to produce a secondary amine in which there is not only present a hydroxyl radical but a repetitious ether linkage. Compounds can be readily obtained which are exemplified by the following formulas:

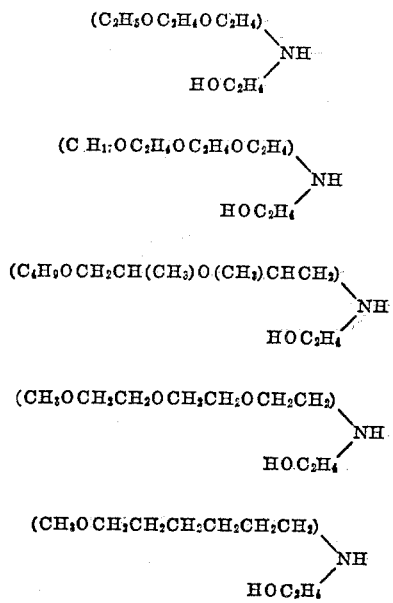

or comparable compounds having two hydroxylated groups of different lengths as in

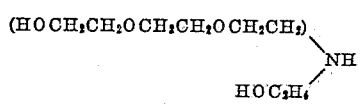

Other examples of suitable amines include alpha-methylbenzylamine and monoethanolamine; also amines obtained by treating cyclohexylmethylamine with one mole of an oxyalkylating agent as previously described; beta-ethylhexyl-butanolamine, diglycerylamine, etc. Another type of amines which is of particular interest because it includes a very definite hydrophile group includes sugar amines such as glucamine, galactamine and fructamine, such as N-hydroxyethylglucamine, N-hydroxyethylgalactamine, and N-hydroxyethylfructamine.

Other suitable amines may be illustrated by

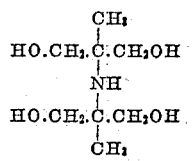

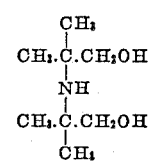

See, also, corresponding hydroxylated amines which can be obtained from rosin or similar raw materials and described in U. S. Patent No. 2,510,063, dated June 6, 1950, to Brief. Still other examples are illustrated by treatment of certain secondary amines, such as the following, with a mole of an oxyalkylating agent as described; phenoxyethylamine, phenoxypropylamine, phenoxyalphamethylethylamine, and phenoxypropylamine.

Other procedures for production of suitable compounds having a hydroxyl group and a single basic amino-nitrogen atom can be obtained from any suitable alcohol or the like by reaction with a reagent which contains an epoxide group and a secondary amine group. Such reactants are described, for example, in U. S. Patents Nos. 1,977,251 and 1,977,253, both dated October 16, 1934, to Stallmann. Among the reactants described in said latter patent are the following:

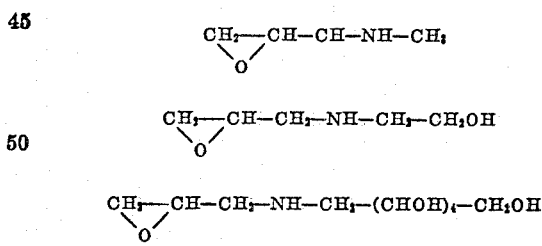

PART 4

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner described in Bruson Patent No. 2,031,557 in order to obtain a heat-reactive resin. Since the condensation products obtained are not heat-convertible and since manufacture is not restricted to a single phase system, and since temperatures up to 150° C. or thereabouts may be employed, it is obvious that the procedure becomes comparatively simple. Indeed, perhaps no description is necessary over and above what has been said previously, in light of subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, I have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether or ethyleneglycol. One can also use a mixture of benzene or xylene and such oxygenated solvents. Note that the use of such oxygenated solvent is not required in the sense that it is not necessary to use an initial resin which is soluble only in an oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, paraformaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction. However, if the reaction mass is going to be subjected to some further reaction where the solvent may be objectionable as in the case of ethyl or hexyl alcohol, and if there is to be subsequent oxyalkylation, then, obviously, the alcohols should not be used or else it should be removed. The fact that an oxygenated solvent need not be employed, of course, is an advantage for reasons stated.

Another factor, as far as the selection of solvent goes, is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost water-white in color, the products obtained are almost invariably a dark red in color or at least a red-amber, or some color which includes both an amber component and a reddish component. By and large, the melting point is apt to be lower and the products may be more sticky and more tacky than the original resin itself. Depending on the resin selected and on the amine selected the condensation product or reaction mass on a solvent-free basis may be hard, resinous and comparable to the resin itself.

The products obtained, depending on the reactants selected, may be water-insoluble, or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

In the next succeeding paragraph it is pointed out that frequently it is convenient to eliminate all solvent, using a temperature of not over 150° C. and employing vacuum, if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of which have been previously mentioned; (a) is the solvent to remain in the reaction mass without removal? (b) is the reaction mass to be subjected to further reaction in which the solvent, for instance, an alcohol either low boiling or high boiling, might interfere as in the case of oxyalkylation?; and the third factor is this, (c) is an effort to be made to purify the reaction mass by the usual procedure as, for example, a water-wash to remove any unreacted low molal soluble amine, if employed and present after reaction? Such procedures are well known and, needless to say, certain solvents are more suitable than others. Everything else being equal, I have found xylene the most satisfactory solvent.

I have found no particular advantage in using a low temperature in the early stage of the reaction because, and for reasons explained, this is not necessary although it does apply in some other procedures that, in a general way, bear some similarity to the present procedure. There is no objection, of course, to giving the reaction an opportunity to proceed as far as it will at some low temperature, for instance, 30° to 40° but ultimately one must employ the higher temperature in order to obtain products of the kind herein described. If a lower temperature reaction is used initially the period is not critical, in fact, it may be anything from a few hours up to 24 hours. I have not found any case where it was necessary or even desirable to hold the low temperature stage for more than 24 hours. In fact, I am not convinced there is any advantage in holding it at this stage for more than 3 or 4 hours at the most. This, again, is a matter of convenience largely for one reason. In heating and stirring the reaction mass there is a tendency for formaldehyde to be lost. Thus, if the reaction can be conducted at a lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so the reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction probably takes place principally at the interfaces and the more vigorous the agitation the more interfacial area. The general procedure employed is invariably the same when adding the resin and the selected solvent, such as benzene or xylene. Refluxing should be long enough to insure that the resin added, preferably in a powdered form, is completely soluble. However, if the resin is prepared as such it may be added in solution form, just as preparation is described in aforementioned U. S. Patent 2,499,368. After the resin is in complete solution the amine is added and stirred. Depending on the amine selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example, 35° C. or slightly lower, provided this initial low temperature stage is employed. The formaldehyde is then added in a suitable form. For reasons pointed out I prefer to use a solution and whether to use a commercial 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

On a large scale if there is any difficulty with formaldehyde loss control, one can use a more dilute form of formaldehyde, for instance, a 30% solution. The reaction can be conducted in an autoclave and no attempt made to remove water until the reaction is over. Generally speaking, such a procedure is much less satisfactory for a number of reasons. For example, the reaction does not seem to go to completion, forming takes place, and other mechanical or chemical difficulties are involved. I have found no advantage in using solid formaldehyde because even here water of reaction is formed.

Returning again to the preferred method of reaction and particularly from the standpoint of laboratory procedure employing a glass resin pot, when the reaction has proceeded as one can reasonably expect at a low temperature, for instance, after holding the reaction mass with or without stirring, depending on whether or not it is homogeneous, at 30° or 40° C., for 4 or 5 hours, or at the most, up to 10-24 hours, I then complete the reaction by raising the temperature up to 150° C., or thereabouts as required. The initial low temperature procedure can be eliminated or reduced to merely the shortest period of time which avoids loss of amine or formaldehyde. At a higher temperature I use a phase-separating trap and subject the mixture to reflux condensation until the water of reaction and the water of solution of the formaldehyde is eliminated. I then permit the temperature to rise to somewhere about 100° C., and generally slightly above 100° C., and below 150° C., by eliminating the solvent or part of the solvent so the reaction mass stays within this predetermined range. This period of heating and refluxing, after the water is eliminated is continued until the reaction mass is homogeneous and then for one to three hours longer. The removal of the solvents is conducted in a conventional manner in the same way as the removal of solvents in resin manufacture as described in aforementioned U. S. Patent No. 2,499,368.

Needless to say, as far as the ratio of reactants goes I have invariably employed approximately one mole of the resin based on the molecular weight of the resin molecule, 2 moles of the secondary amine and 2 moles of formaldehyde. In some instances I have added a trace of caustic as an added catalyst but have found no particular advantage in this. In other cases I have used a slight excess of formaldehyde and, again, have not found any particular advantage in this. In other cases I have used a slight excess of amine and, again, have not found any particular advantage in so doing. Whenever feasible I have checked the completeness of reaction in the usual ways including the amount of water of reaction, molecular weight, and particularly in some instances have checked whether or not the end-product showed surface-activity, particularly in a dilute acetic acid solution. The nitrogen content after removal of unreacted amine if any is present, is another index.

In light of what has been said previously, little more need be said as to the actual procedure employed for the preparation of the herein described condensation products. The following example will serve by way of illustration.

*Example 1b*

The phenol-aldehyde resin is the one that has been identified previously as Example 2a. It was obtained from a para-tertiary butylphenol and formaldehyde. The resin was prepared using an acid catalyst which was completely neturalized at the end of the reaction. The molecular weight of the resin was 882.5. This corresponded to an average of about 3½ phenolic nuclei, as the value for $n$ which excludes the 2 external nuclei, i. e., the resin was largely a mixture having 3 nuclei or 4 nuclei, excluding the 2 external nuclei, or 5 and 6 overall nuclei. The resin so obtained in a neutral state had a light amber color.

882 grams of the resin identified as 2a preceding were powdered and mixed with 700 grams of xylene. The mixture was refluxed until solution was complete. It was then adjusted to approximately 30° to 35° C. and 210 grams of diethanolamine added. The mixture was stirred vigorously and formaldehyde added slowly. The formaldehyde used was a 37% solution and 160 grams were employed which were added in about 3 hours. The mixture was stirred vigorously and kept within a temperature range of 30° to 45° C. for about 21 hours. At the end of this period of time it was refluxed, using a phase-separating trap and a small amount of aqueous distillate withdrawn from time to time and the presence of unreacted formaldehyde noted. Any unreacted formaldehyde seemed to disappear within approximately 3 hours after the refluxing was started. As soon as the odor of formaldehyde was no longer detectible the phase-separating trap was set so as to eliminate all water of solution and reaction. After the water was eliminated part of the xylene was removed until the temperature reached about 150° C. The mass was kept at this higher temperature for about 3¾ hours and reaction stopped. During this time any additional water, which was probably water of reaction which had formed, was eliminated by means of the trap. The residual xylene was permitted to stay in the cogeneric mixture. A small amount of the sample was heated on a water bath to remove the excess xylene and the residual material was dark red in color and had the consistency of a sticky fluid or a tacky resin. The overall reaction time was a little over 30 hours. In other instances it has varied from approximately 24 to 36 hours. The time can be reduced by cutting the low temperature period to about 3 to 6 hours.

Note that in Table II following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C. or thereabouts. Usually the mixture yielded a clear solution by the time the bulk of the water, or all of the water, had been removed.

Note that as pointed out previously, this procedure is illustrated by 24 examples in Table II.

TABLE II

| Ex. No. | Resin used | Amt., grs. | Amine used and amount | Strength of formaldehyde soln. and amt. | Solvent used and amt. | Reaction Temp., °C. | Reaction time, hrs. | Max. distill. temp., °C. |
|---|---|---|---|---|---|---|---|---|
| 1b | 2a | 882 | Diethanolamine, 210 g | 37%, 162 g | Xylene, 700 g | 22-26 | 32 | 137 |
| 2b | 5a | 480 | Diethanolamine, 105 g | 37%, 81 g | Xylene, 450 g | 21-23 | 28 | 150 |
| 3b | 10a | 633 | ____do____ | ____do____ | Xylene, 600 g | 20-22 | 36 | 145 |
| 4b | 2a | 441 | Dipropanolamine, 133 g | 30%, 100 g | Xylene, 400 g | 20-23 | 34 | 146 |
| 5b | 5a | 480 | ____do____ | ____do____ | Xylene, 450 g | 21-23 | 24 | 141 |
| 6b | 10a | 633 | ____do____ | ____do____ | Xylene, 600 g | 21-28 | 24 | 145 |
| 7b | 2a | 882 | Ethylethanolamine, 178 g | 37%, 162 g | Xylene | 20-26 | 24 | 152 |
| 8b | 5a | 480 | Ethylethanolamine, 89 g | 37%, 81 g | Xylene, 450 g | 24-30 | 28 | 151 |
| 9b | 10a | 633 | ____do____ | ____do____ | Xylene, 600 g | 22-25 | 27 | 147 |
| 10b | 13a | 473 | Cyclohexylethanolamine, 143 g | 30%, 100 g | Xylene, 450 g | 21-31 | 31 | 146 |
| 11b | 14a | 511 | ____do____ | 37%, 81 g | ____do____ | 22-23 | 36 | 148 |
| 12b | 15a | 665 | ____do____ | ____do____ | Xylene, 550 g | 20-24 | 27 | 152 |
| 13b | 2a | 441 | C₂H₅OC₂H₄OC₂H₄\NH, 176 g. /HOC₂H₄ | ____do____ | Xylene, 400 g | 21-25 | 24 | 150 |
| 14b | 5a | 480 | C₂H₅OC₂H₄OC₂H₄\NH, 176 g. /HOC₂H₄ | ____do____ | Xylene, 450 g | 20-26 | 26 | 146 |
| 15b | 9a | 595 | C₂H₅OC₂H₄OC₂H₄\NH, 176 g. /HOC₂H₄ | ____do____ | Xylene, 550 g | 21-27 | 30 | 147 |
| 16b | 2a | 441 | HOC₂H₄OC₂H₄OC₂H₄\NH, 192 g. /HOC₂H₄ | ____do____ | Xylene, 400 g | 20-22 | 30 | 148 |
| 17b | 5a | 480 | HOC₂H₄OC₂H₄OC₂H₄\NH, 192 g. /HOC₂H₄ | ____do____ | ____do____ | 20-25 | 28 | 150 |
| 18b | 14a | 511 | HOC₂H₄OC₂H₄OC₂H₄\NH, 192 g. /HOC₂H₄ | ____do____ | Xylene, 500 g | 21-24 | 32 | 149 |
| 19b | 22a | 498 | HOC₂H₄OC₂H₄OC₂H₄\NH, 192 g. /HOC₂H₄ | ____do____ | Xylene, 450 g | 22-25 | 32 | 153 |
| 20b | 23a | 542 | CH₃(OC₂H₄)₃\NH, 206 g. /HOC₂H₄ | 30%, 100 g | Xylene, 500 g | 21-23 | 36 | 151 |
| 21b | 25a | 547 | CH₃(OC₂H₄)₃\NH, 206 g. /HOC₂H₄ | ____do____ | ____do____ | 25-30 | 34 | 148 |
| 22b | 2a | 441 | CH₃(OC₂H₄)₃\NH, 206 g. /HOC₂H₄ | ____do____ | Xylene, 400 g | 22-23 | 31 | 146 |
| 23b | 26a | 595 | Decylethanolamine, 201 g | 37%, 81 g | Xylene, 500 g | 22-27 | 24 | 145 |
| 24b | 27a | 391 | Decylethanolamine, 100 g | 30%, 50 g | Xylene, 300 g | 21-25 | 26 | 147 |

As has been pointed out, what has been described previously is the condensate implying the 1:2:2 ratio as specified in co-pending application, Serial No. 288,743. Such material, which is the final reaction of the aforementioned co-pending application, may be employed as an intermediate for the production of the herein described more complex condensates. Needless to say, such condensates can be obtained without an intermediate step as noted previously and as will be illustrated subsequently. There has been a previous statement as to the possible composition of the intermediate. Needless to say, the present condensates employing different reactant ratios, as for example, an increased amount of the amine and an increased amount of formaldehyde, result in different ultimate products, at least in part.

Actually what resultants are obtained, or rather what cogeneric mixtures or resultants are obtained, is in part obscure. For purpose of illustration a dialkanolamine such as diethanolamine, will be used but it is to be noted that a monohydroxylated amine, for instance, ethylethanolamine, could be used. Consider the simple situation where an intermediate amine condensate of the kind described and prepared in the manner specified previously, is reacted additionally with two moles of diethanolamine and two moles of formaldehyde, based on a mole of resin originally employed as a reactant in the intermediate manufacture. Obviously, one mole of formaldehyde could combine with two moles of diethanolamine, thus:

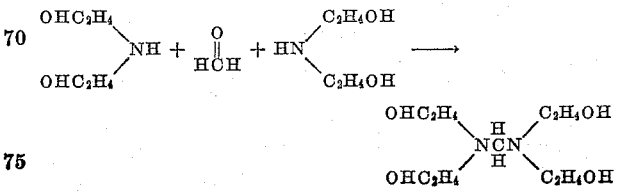

Furthermore, one mole of diethanolamine and one mole of formaldehyde could combine to form a cyclic compound, thus:

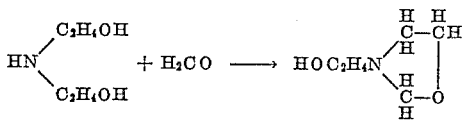

The compounds derived in the above manner may then react with an aryl radical, or with the residual amine radical in the intermediate. It has been suggested that under conditions as herein employed that reaction involves 2 phenolic hydroxyl hydrogen atoms. Actually, the phenolic hydroxyl hydrogen atoms are part of the resin molecule but the reaction might be shown simply thus:

This reaction appears very doubtful for the simple reason that the use of an alkaline catalyst in producing phenol-aldehyde resins from difunctional phenols rarely causes cross-linking. One would expect cross-linking and insolubilization if this reaction did take place to any significant degree. Another suggestion as to a possible reaction has been along the line that a phenolic hydroxyl (again as part of the resin molecule but here depicted as a single phenol) might react with monoethanolamine, thus:

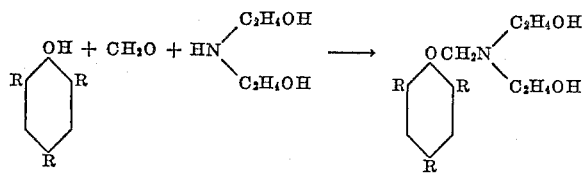

Still another suggestion has been reaction involving the meta group in the terminal phenol radical. This can be indicated in the following manner:

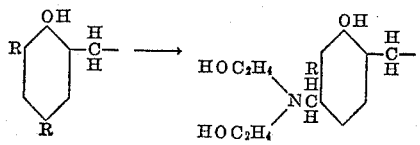

Another suggestion has been that chemical reactivity takes place in this particular manner but instead of involving a hydrogen in the meta position of a terminal phenol radical, there is involved instead of hydrogen atom which is part of a methylene bridge or the equivalent. This is not shown for the reason that it is comparable to the reaction previously suggested.

Still a different reaction has been suggested; that dehydration takes place at terminal ethanol groups forming a terminal unsaturated linkage and thus ultimately entering into a vinyl condensation, or the equivalent.

Another thought is one which, in a general way, is perfectly reasonable but any specific suggestion as to structure is obscure. The suggestion is of interest particularly since it may explain the elimination of formaldehyde in a subsequent stage of manufacture as referred to later. The idea briefly is nothing more than to the effect that formaldehyde may produce a divalent radical, thus:

which appears at some point between a nitrogen atom and a hydrogen atom, or between an oxygen atom and a hydrogen atom, or in some similar position to give a compound which is only partially heat-stable at the upper temperature range.

See chapter 12, Formaldehyde, Walker, 2nd ed., 1953, Reinhold Pub. Corp., N. Y.

Without attempting to explore the ultimate composition further it is obvious, in fact, that no further directions are really required for the reason that all one need do is employ the intermediates as described in Table II and add the designated amount of reactants and proceed as previously in approximately the same temperature range as before, generally speaking, 140° to 150° or 160° C. Note, however, that if desired a different amine can be used in the split-step procedure as, for example, one could start with diethanolamine and could complete the reaction in the second step by using diisopropanolamine; or one could start with diisopropanolamine and complete the second step by using ethylethanolamine; or one could start with dibutanolamine and complete the step using cyclohexanolamine. Furthermore, using the split step procedure, one can use an amine in which a phenyl group is directly joined to the amino nitrogen atom as in the case of phenylethanolamine, phenylpropanolamine, phenylbutanolamine, etc. Furthermore, an acyl radical may be part of the hydroxylated amine as, for example, acetyl ethanolamine, oleyl propanolamine, ethanolstearylamine. Apparently if the basicity is high enough due to the inherent basicity of the intermediate condensate, reaction will take place with amino compounds having hydroxyl groups and aminohydrogen atom, even though in such case the basicity is comparatively low due to the presence of a negative group, such as a phenyl group or acyl radical directly attached to the amino nitrogen atom. Compounds may be employed having a sulfonamide group present.

The procedure employed is illustrated by the following examples:

*Example 1c*

The intermediate condensate employed was 1b. The particular sample represented a solution of approximately 1120 grams of the condensate and 700 grams of xylene. To this there were added 210 grams of diethanolamine and 162 grams of 37% formaldehyde. The mixture was stirred for approximately two hours at approximately room temperature, for instance 20° to 35° C., and then refluxed for 4 hours at a temperature in the neighborhood of the boiling point of water or somewhat higher. A phase-separating trap was then set to eliminate water of solution from aqueous formaldehyde and also water of formation and the temperature allowed to rise to approximately 135° C. During this stage some xylene was removed so as to allow the temperature to rise to 150° C. or thereabouts and refluxing continued for a total of 6 hours in this upper range, i. e., 145–160° C. In any event, refluxing was continued for at least 2 hours after there was no further water draw-off. At the end of this period any xylene which had been distilled off was returned to the mixture. In some instances some xylene or other solvent was added, either at the start or the finish of the second step. This was purely a matter of convenience. Stirring was employed throughout but at the end of the condensation step the entire mixture was homogeneous and stirring was merely a matter of convenience for ease of continuing the reaction and controlling even distillation. The final condensate on a solvent-free basis was approximately 1400 grams.

As has been pointed out previously, for one mole of resin used initially there are employed at least three moles of formaldehyde and three moles of the hydroxylated secondary amine, i. e., at least one mole more of formaldehyde and at least one mole more of amine and specified as the basis of reaction in the formula mentioned in copending application Serial No. 288,743. As a matter of fact, our preferred ratio is approximately 1:3.5:3.5, or at the most 1:4:4.

Stated another way, if one starts with the intermediate condensate as described in Table II, preceding, there is added a minimum of about 1.5 moles amine and 1.5 moles more formaldehyde and in some cases 2 moles more of each one, than in the preparation of condensates of the kind described in my aforementioned application, Serial No. 288,743.

The reaction, regardless of how conducted, that is, whether it goes through an intermediate condensation or not, is continued until there is no more evolution of water and for some time beyond, for instance, one or two hours. During this last stage there is usually a continued evolution of formaldehyde. In the early stages, formaldehyde that is evolved is unquestionably uncombined formaldehyde which is not soluble in the reaction mass or at least formaldehyde which is evolved during the stage that the reaction mass is not homogeneous. Secondly, there seems to be a continuation of formaldehyde evolution during the stage where the reaction mass is homogeneous but there is still water of solution present or at least water is being formed. There then appears to be a third stage in which some formaldehyde is evolved and it may be formaldehyde being evolved from a type of compound which is stable at the low temperatures but not stable at the higher temperatures, for instance, 130°, 140° or 150°. Finally, there seems to be a slow evolution of formaldehyde as long as the operation is continued especially at the maximum temperature. If the formaldehyde forms a stable compound, or compounds, there seems to be a break up at a slow rate in the final stages in most instances. This simply means the weight of the final product is generally less than the weight would be if all the formaldehyde combined chemically. This is shown in the tabular data in Table III. If there were a definite point where evolution of formaldehyde ceased it might throw some light on the possible structure of mixture of compounds obtained. There is no doubt that in a number of instances where perhaps 3.5 or 4 moles of formaldehyde are employed the amount combined chemically at the end of the reaction period may not be in excess of 2.5 or in any event less than 3. This point is emphasized merely to the extent that it is an explanation of what appears in Table III.

In the table the value for the final product on a solvent-free basis is determined by taking a small sample and evaporating in vacuum so as to eliminate the xylene. No effort was made to eliminate the xylene from the reaction mass for the simple reason that it was most advantageous to keep it as a solution. The residual product was examined for color and there might have been a further loss of formaldehyde during this small-scale evaporation stage. Furthermore, there might also be a trace of xylene remaining behind. In other words, the final figures for the completed condensate product are values which are as close as can be determined for reasonable accuracy but may be subject to some variation.

ture of Example 1b but in which the amount of reactants employed at the very start are identical with those employed in both steps of 1c. Stated another way, as far as one can determine, the ultimate composition 1b is the same as that of 1c. The resin used was phenol-aldehyde resin 2a, and the amount used was 882 grams. The amount of xylene used was 800 grams and the amount of diethanolamine was just twice that used in Example 1b, to wit, 420 grams, and the amount of formaldehyde (37% solution) was just twice that used in Example 1b, to wit, 324 grams. The various time periods were substantially the same as in 1b, and the temperatures at various stages the same as in 1b. The product obtained at the end of the reaction, for all practical purposes, seemed to be the same as in 1c. The yield was substantially the same as the yield of 1c, to wit, 1415 grams on a solvent-free basis.

*Example 1e*

This is simply a further alternate procedure which can be employed. The procedure is the same as in 1c, to wit, the same amount of intermediate condensate 1b is employed, to wit, 1120 grams on a solvent-free basis. 600 grams of solvent were used. However, the additional amine employed, and formaldehyde employed, were reacted separately and then added to intermediate resin 1b. 210 grams of diethanolamine were reacted with 162 grams of 37% formaldehyde in a separate vessel by simply stirring at room temperature (20° to 35° C.) for six hours. The next step consisted in refluxing for 2 hours. Prior to the reflux stage 200 grams of xylene were added. After 2 hours' refluxing a phase-separating trap was employed to start the elimination of water. During this stage not only was water eliminated but also uncombined formaldehyde. After the water was entirely eliminated, some solvent was removed until the temperature rose to about the range of 145° to 155° C. The reaction was continued at this temperature for about 3½ hours more. The mass was then transferred and mixed with the intermediate 1b, previously described (1120 grams of intermediate condensate and 700 grams of xylene) in another vessel. 162 grams of formaldehyde (37% solution) were added and from this point forward the reaction was handled in the same manner as 1c. The final product appeared to be identical, as far as physical appearance goes, with 1c or 1b.

Previous reference has been made to the color of intermediate 1b. Actually, color and consistency of all the products prepared are much the same, to wit, varying from red to red-amber to dark red or almost blackish red. In each case the product obtained was softer than the original resin, in fact, represented either a semi-viscous or viscous liquid. In some instances the viscosity of the liquid was extremely high. Actually, there is no advantage in decolorization particularly for the purpose herein described.

TABLE III

| Complete condensate, Ex. No. | Intermediate condensate, Ex. No. | Amt. solvent free basis, grams | Solvent (xylene), grams | Secondary amine compound | Amt. amine compound, grams | 37% formaldehyde, grams | Added solvent if any (xylene), grams | Reflux period (hrs.) | Reaction period after water take-off (hrs.) | Maximum distillation temp., °C. | Amt. of final condensate (solvent-free basis), grams |
|---|---|---|---|---|---|---|---|---|---|---|---|
| 1c | 1b | 1,120 | 700 | Diethanolamine | 210 | 162 | None | 6 | 2 | 160 | 1,420 |
| 2c | 2b | 1,230 | 1,000 | ----do---- | 210 | 162 | 100 | 6 | 2 | 155 | 1,530 |
| 3c | 3b | 1,545 | 1,100 | ----do---- | 210 | 243 | 200 | 5 | 3 | 153 | 1,800 |
| 4c | 4b | 1,165 | 900 | Diisopropanolamine | 265 | 162 | | 5.5 | 2.5 | 162 | 1,440 |
| 5c | 5b | 1,275 | 900 | ----do---- | 265 | 162 | | 5 | 2.75 | 145 | 1,550 |
| 6c | 6b | 1,590 | 1,000 | ----do---- | 265 | 243 | 100 | 6 | 3 | 147 | 1,865 |
| 7c | 1b | 1,120 | 700 | ----do---- | 265 | 162 | | 7 | 3 | 155 | 1,400 |
| 8c | 2b | 1,230 | 1,000 | ----do---- | 265 | 162 | | 7 | 4 | 157 | 1,500 |
| 9c | 4b | 1,165 | 800 | Ethylmonoethanolamine | 210 | 162 | | 6 | 2 | 160 | 1,395 |
| 10c | 5b | 1,275 | 950 | ----do---- | 210 | 162 | 100 | 4.75 | 2¼ | 163 | 1,590 |
| 11c | 1b | 1,120 | 700 | Diethanolamine | 157 | 122 | 100 | 5 | 2¼ | 160 | 1,350 |
| 12c | 2b | 1,230 | 1,000 | ----do---- | 157 | 122 | | 5 | 3 | 162 | 1,445 |
| 13c | 4b | 1,160 | 900 | Dipropanolamine | 200 | 122 | 100 | 6 | 3 | 154 | 1,430 |
| 14c | 5b | 1,280 | 900 | ----do---- | 200 | 122 | 100 | 6 | 3 | 151 | 1,465 |

*Example 1d*

This is merely an example illustrating the procedure employed which is identical with that used in the manufac- If desired, the product could be decolorized by using filtering clays, chars, or the like, in the same manner as noted in connection with 1b.

As has been pointed out previously when the herein specified reactant ratio is used with a secondary amine it is impossible to rule out the fact that there might be an amino nitrogen atom present. Usually amidification takes place under such circumstances in preference to esterification. In order to emphasize the fact that such linkage is possible the procedure has been referred to as acylation although obviously in most instances it probably is esterification exclusively.

PART 5

Needless to say, the two prior reactants can be combined readily by means of an acylation reaction and more specifically, in all likelihood, an esterification reaction. Assuming that, at least under some conditions, the products of the kind described in Part 4 may have an amino hydrogen present in addition to a reactive hydrogen attached to an oxygen atom it is conceivable that amidification may take place as well as esterification. However, certainly by and large the usual reaction is esterification.

It has been pointed out that the amine-modified condensate under any condition must have at least two alkanol hydroxyl groups and may have more, for instance, 3, 4, 5, or 6.

It is to be noted the carboxylated resins may be monofunctional, difunctional or even may contain 3 or more carboxyls. For practical purposes the preferred resin contains one or two carboxyl groups. A carboxylated resin having one carboxyl group may be reacted with a suitable amine-modified resin so as to combine only one such carboxylated resin molecule. Similarly, the amine-modified resin molecule may combine with at least two such monocarboxylated resin molecules. In some instances as, for example, when derived from diethanolamine or dipropanolamine the amine-modified resin may be combined with as many as 4 or perhaps as many as 6 monocarboxylated resin units.

When the carboxylated resin contains more than one carboxyl group, for instance, two carboxyl groups, the same combinations as above indicated may take place but in addition there may be formed linear polymers and also polymers showing cross-linking, at least to some modest degree. Modest cross-linking is not objectionable provided the resultant product is still soluble in an organic solvent and is thermoplastic. The objective is to obtain a product which, regardless of its other uses, is readily susceptible to oxyalkylation. Thus, soluble complicated resins have been obtained using dicarboxylated resins and compounds obtained from dialkanolamines in which structures other than linear polymer structure appears.

The reaction involving the carboxylated resin is acylation, broadly speaking, and essentially esterification but amidification may be involved. For practical purposes the simplest phase of the reaction may be illustrated by the reactions described in my co-pending application, Serial No. 388,051, filed October 23, 1953. In this instance the reaction between the carboxylated resins and amine-modified phenol-aldehyde resins is concerned with those in which the ratio of resin molecule to amine molecule to formaldehyde is 1:2:2. This type of amine-modified resin is described as an intermediate resin condensate in Part 4, preceding. Thus, what is said in co-pending application, Serial No. 388,051, is applicable here and presents the simplest aspect of the combination. What is there said is as follows:

"Returning to the over-simplified presentation of the amine-modified resin and particularly one obtained from diethanolamine, for example, or for that matter from ethylethanolamine, the product would be illustrated thus:

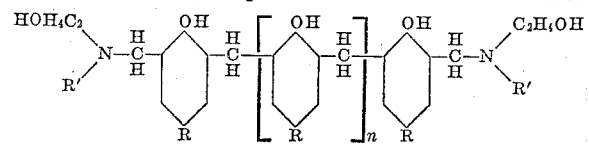

in which R' is alkyl or alkanol."

There has been presented earlier an idealized formula for the carboxylated resin. The terminal part of the molecule may be shown thus

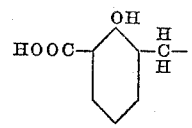

Without attempting to include all ramifications and particularly where the amine radical is polyhydroxylated, it becomes apparent that in the use of a simple monohydroxylated amine, such as ethylethanolamine, in the manufacture of the amine-modified resin, the radical which has been shown previously becomes part of an ester linkage which may be illustrated thus:

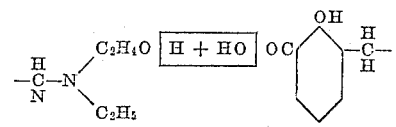

It is again to be emphasized there may be reaction products present in which formaldehyde has eliminated an alkanol hydrogen atom but there is present an amino hydrogen atom and, thus, a reaction comparable to the one just illustrated takes place but involves amidification.

The compounds can be prepared without the use of any solvent although for obvious reasons it is preferable that a solvent be used. Indeed, it is specified that the resins employed be xylene-soluble. In every instance xylene was used as a solvent but obviously any other comparable solvent such as ethylbenzene, cymene, or the like, can be employed. However, xylene seems to be very suitable.

The general procedure was to dissolve the carboxylated resin in xylene as indicated and then add the amine-modified resin using a reflux condenser with a phase-separating trap. The reaction was conducted for a period of time at a comparatively low temperature, for instance somewhere above the boiling point of water, and then gradually was taken to a higher tempeature, for instance, 140° C. to 150° C. There were two reasons for this procedure. An effort was made to limit the reaction as far as possible to the acylation (esterification) and to avoid more complicated reactions such as possible ring formation and the like. Secondly, the effort was made in all instances to avoid gelation or cross-linking so as to yield an insoluble product. If the resultant of reaction became thick and showed incipient cross-linking the reaction was stopped provided the theoretical amount of water, or approximately the theoretical amount, had been eliminated. If there happened to be no danger of cross-linking or ring formation in light of the particular reactants selected, any suitable temperature could be employed.

Water of reaction as formed was eliminated by means of the phase-separating trap and if required the xylene or other solvent employed was eliminated so as to raise the temperature sufficiently high to eliminate the theoretical water of esterification or approximately this amount.

It is not necessary that esterification eliminate all carboxyl radicals or all hydroxyl radicals. Thus, in the use of a carboxylated resin having 2 or more carboxyl radicals if desired the reaction may be conducted so that only one carboxyl radical is reacted. Thus, the residual product may have a free carboxyl radical, or a free carboxyl radical and a free hydroxyl radical. In such instances where all the carboxyl radicals are esterified there may be free hydroxyl radicals, or even where only one carboxyl group is reacted.

The entire procedure is conventional and, in fact, has been described in the formation of other esters or amides of acylated products using carboxylated resins.

Example 1f

The carboxylated resin employed was 4aa. The amine-modified resin employed was 1c. The molecular weight of carboxylated resin 4aa was 846. A gram mole of the resin, to wit, 846 grams, was reacted with 1355 grams of the amine-modified resin (xylene-free basis). The amount of xylene present both as a solvent for the two reactants and as added solvent was 1250 grams. The mixture started to reflux at approximately 104° C. and rose rapidly to about 123° C. Xylene was then withdrawn until a temperature of about 161° C. was reached. The mixture was allowed to reflux at this temperature for approximately 5.5 hours during which time period 18 grams of water were eliminated. The reaction was stopped and the xylene which had been withdrawn during the reflux period was returned to the reaction mass.

This example and other examples are presented in Table IV following.

TABLE IV

| Ex. No. | Carboxylated resin, Ex. No. | Mol. ratio | Mol. wt. | Amt. used, grams | Amine modified resin | Wt. of amine modified resin (xylene-free basis), grams | Solvent (xylene) at start, grams | Time, hrs. | Max. temp., ° C. | Water out, ml. |
|---|---|---|---|---|---|---|---|---|---|---|
| 1f  | 4aa | 1:1 | 846  | 846  | 1c | 1,355 | 1,250 | 5.5 | 161 | 18 |
| 2f  | 4aa | 1:2 | 846  | 846  | 1c | 2,710 | 1,700 | 6   | 163 | 36 |
| 3f  | 4aa | 1:1 | 846  | 846  | 2c | 1,465 | 1,425 | 6   | 170 | 18 |
| 4f  | 4aa | 1:2 | 846  | 846  | 2c | 2,930 | 2,125 | 7   | 159 | 36 |
| 5f  | 4aa | 1:1 | 846  | 846  | 3c | 1,755 | 1,638 | 8   | 160 | 18 |
| 6f  | 4aa | 1:2 | 846  | 846  | 3c | 3,510 | 2,448 | 6   | 163 | 36 |
| 7f  | 4aa | 1:1 | 846  | 846  | 4c | 1,455 | 1,244 | 6   | 163 | 18 |
| 8f  | 4aa | 1:2 | 846  | 846  | 4c | 2,910 | 1,860 | 5   | 167 | 36 |
| 9f  | 4aa | 1:1 | 846  | 846  | 5c | 1,565 | 1,500 | 7   | 164 | 18 |
| 10f | 4aa | 1:2 | 846  | 846  | 5c | 3,130 | 2,175 | 4.5 | 161 | 36 |
| 11f | 3aa | 1:1 | 872  | 872  | 6c | 1,885 | 1,600 | 5.5 | 160 | 18 |
| 12f | 3aa | 1:1 | 872  | 872  | 6c | 1,885 | 1,600 | 7   | 160 | 18 |
| 13f | 3aa | 1:1 | 872  | 872  | 1c | 1,355 | 1,250 | 6.5 | 167 | 18 |
| 14f | 6aa | 1:1 | 972  | 972  | 2c | 1,465 | 1,425 | 8   | 168 | 18 |
| 15f | 6aa | 1:1 | 972  | 972  | 3c | 1,755 | 1,638 | 8   | 167 | 18 |
| 16f | 6aa | 1:1 | 972  | 972  | 5c | 1,565 | 1,490 | 7   | 163 | 18 |
| 17f | 2aa | 1:2 | 1014 | 1014 | 1c | 2,710 | 1,870 | 7   | 161 | 36 |
| 18f | 2aa | 1:2 | 1014 | 1014 | 2c | 2,930 | 2,135 | 6   | 160 | 36 |
| 19f | 2aa | 1:2 | 1014 | 1014 | 3c | 3,510 | 2,450 | 6.5 | 165 | 36 |
| 20f | 4aa | 1:1 | 846  | 846  | 1c | 1,355 | 1,250 | 8.5 | 170 | 36 |
| 21f | 4aa | 1:1 | 846  | 846  | 2c | 1,465 | 1,425 | 9.5 | 171 | 36 |
| 22f | 4aa | 1:1 | 846  | 846  | 3c | 1,755 | 1,640 | 9   | 173 | 36 |
| 23f | 4aa | 1:1 | 846  | 846  | 4c | 1,455 | 1,230 | 12  | 169 | 36 |
| 24f | 4aa | 1:1 | 846  | 846  | 5c | 1,565 | 1,400 | 11  | 168 | 36 |
| 25f | 4aa | 1:1 | 846  | 846  | 6c | 1,885 | 1,738 | 11  | 164 | 36 |

Note that in the last six examples a mole of dicarboxylated resin was reacted mole-for-mole with a polyhydroxylated amine-modified resin. The reaction was continued in an effort to produce a linear polymer, to wit, to esterify both carboxyls of the carboxylated resin. The reaction probably ended with free hydroxyl groups and perhaps a structure more complicated, at least to some degree than a simple linear polymer. Note the ratio for example of reactants in 20f is identical with that in 1f but in 20f the amount of water eliminated was approximately 36 grams as compared with 18 grams in 1f.

PART 6

The products obtained as described may be used for various purposes in which surface-active agents may be employed. When combined with acids such as hydroxy acid, lactic acid, gluconic acid, or the like, the salts show increased hydrophile properties. When combined with higher fatty acids, high molal monosulfonic acids such as mahogany acids, the products show increased hydrophobe effect. These compounds as such, or in salt form, may be employed as additives to demulsifying agents.

The products are particularly valuable as additives for demulsifying agents employed in conjunction with concentrated hydrochloric acid. They may be used as corrosion inhibitors or rust preventives, particularly in combination with chromium compounds as described in U. S. Patent No. 2,450,807, dated October 5, 1948, to McCarthy.

They may be used as anti-stripping agents in connection with asphalt.

In some instances they are effective for the resolution of petroleum emulsions of the oil-in-water type.

The most important use, however, as far as I am aware, is as an intermediate.

The above products can be subjected to oxyalkylation, particularly with an alkylene oxide having not over 4 carbon atoms such as ethylene oxide, butylene oxide, propylene oxide, glycide, methylglycide, etc., to produce a variety of materials, some of which are extremely hydrophile, others which show hydrophile-hydrophobe balance, particularly if ethylene oxide is used in combination with butylene oxide or propylene oxide. The compounds so obtained are extremely useful for the resolution of petroleum emulsions of the water-in-oil type. All that is required is to follow the procedure set forth in U. S. Patent No. 2,636,038, dated April 21, 1953, to Brandner.

The compounds herein described can be reacted with diepoxides so as to form a more complex molecule and then reacted with monoepoxides as above described to give additional products useful for various purposes and particularly the resolution of petroleum emulsions of the water-in-oil type.

Having thus described my invention what I claim as new and desire to secure by Letters Patent is:

1. An acylation process comprising reacting (A) a carboxylated phenol-aldehyde resin, and (B) an amine-modified phenol-aldehyde resin in a molar ratio of carboxylated resin to amine-modified resin of 1 to 6:1, said carboxylated resin (A) being a fusible, carboxyl-containing, xylene-soluble, water-insoluble, low-stage phenol-aldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula

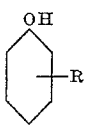

in which R is a hydrocarbon radical having at least 4 and not more than 14 carbon atoms and substituted in one of the positions ortho and para; said amine-modified phenol-aldehyde resin (B) being the product obtained by the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol forming reactivity; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

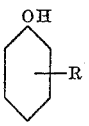

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; with the further proviso that the molar ratio of reactants (c) (b) and (a) be 3:3 to 4:4 to approximately 1 respectively; with the added proviso that the resinous condensation product resulting from the process be heat-stable, oxyalkylation-susceptible and contain at least two alkanol radicals; and with the final proviso that the product of acylation be thermoplastic and organic solvent-soluble.

2. The process of claim 1 with the proviso that the carboxylated resin molecule have approximately 5 phenolic nuclei of which not over 2 are obtained from salicylic acid.

3. The process of claim 1 with the proviso that the carboxylated resin molecule have approximately 5 phenolic nuclei of which 2 are obtained from salicylic acid.

4. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1.

5. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified phenol-aldehyde resin condensate be obtained from a dialkanolamine.

6. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified phenol-aldehyde resin condensate be obtained from a dialkanolamine having not over 6 carbon atoms in the alkanol group.

7. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of diethanolamine as a reactant.

8. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of dipropanolamine as a reactant.

9. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of dibutanolamine as a reactant.

10. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of dihexanolamine as a reactant.

11. The product obtained by the manufacturing process defined in claim 1.

12. The product obtained by the manufacturing process defined in claim 2.

13. The product obtained by the manufacturing process defined in claim 3.

14. The product obtained by the manufacturing process defined in claim 4.

15. The product obtained by the manufacturing process defined in claim 5.

16. The product obtained by the manufacturing process defined in claim 6.

17. The product obtained by the manufacturing process defined in claim 7.

18. The product obtained by the manufacturing process defined in claim 8.

19. The product obtained by the manufacturing process defined in claim 9.

20. The product obtained by the manufacturing process defined in claim 10.

No references cited.